US009849820B2

United States Patent
Bohlke et al.

(10) Patent No.: US 9,849,820 B2
(45) Date of Patent: Dec. 26, 2017

(54) RECEIVING DEVICE FOR AT LEAST ONE FOOD OR BEVERAGE CONTAINER IN A MOTOR VEHICLE

(71) Applicants: Hartmut Bohlke, Wuppertal (DE); Bogdan Tutelea, Leichlingen (DE); Andreas Goebbels, Kuerten (DE); Tanja Pink, Wuppertal (DE); Wolfgang Sitzler, Wuppertal (DE); Wolfram Zummack, Troisdorf (DE)

(72) Inventors: Hartmut Bohlke, Wuppertal (DE); Bogdan Tutelea, Leichlingen (DE); Andreas Goebbels, Kuerten (DE); Tanja Pink, Wuppertal (DE); Wolfgang Sitzler, Wuppertal (DE); Wolfram Zummack, Troisdorf (DE)

(73) Assignee: BOS GMBH & CO. KG, Ostfildern (DE)

( * ) Notice: Subject to any disclaimer, the term of this patent is extended or adjusted under 35 U.S.C. 154(b) by 71 days.

(21) Appl. No.: 14/876,241

(22) Filed: Oct. 6, 2015

(65) Prior Publication Data

US 2016/0101718 A1    Apr. 14, 2016

(30) Foreign Application Priority Data

Oct. 10, 2014   (DE) .......................... 10 2014 220 595

(51) Int. Cl.
*B60R 7/00*      (2006.01)
*B60N 3/10*      (2006.01)

(52) U.S. Cl.
CPC ..................... *B60N 3/106* (2013.01)

(58) Field of Classification Search
CPC ....................................................... B60N 3/106
(Continued)

(56) References Cited

U.S. PATENT DOCUMENTS 5,171,061 A * 12/1992 Marcusen ............ B60N 2/4686
                                                                 248/311.2
5,921,519 A    7/1999 Dexter et al.
(Continued)

FOREIGN PATENT DOCUMENTS

DE   101 34 027 A1   1/2003
DE   101 51 794 A1   4/2003
(Continued)

OTHER PUBLICATIONS

Office Action of German Patent Office issued in Application No. 10 2014 220 595.6 dated Aug. 7, 2015 (7 pages).

*Primary Examiner* — Derek Battisti
(74) *Attorney, Agent, or Firm* — Flynn, Thiel, Boutell & Tanis, P.C.

(57) ABSTRACT

Receiving device for at least one food or beverage container in a motor vehicle having a trough-shaped receiving housing which has a base and wall sections, and at least one movable supporting part which, together with a side wall section of the receiving housing, forms a container holder in order to support a food or beverage container. The at least one supporting part is mounted in an infinitely adjustable manner in the receiving housing. At least one tension or compression spring arrangement is provided which continuously exerts a tensile or compressive force in the adjustment direction on the at least one supporting part.

15 Claims, 4 Drawing Sheets

(58) Field of Classification Search
USPC .......................................................... 224/544
See application file for complete search history.

(56) References Cited

U.S. PATENT DOCUMENTS

| | | | | |
|---|---|---|---|---|
| 6,039,296 | A * | 3/2000 | Nishina | .................... B60N 3/10 |
| | | | | 224/926 |
| 6,230,948 | B1 * | 5/2001 | Steiger | .................... B60N 3/102 |
| | | | | 224/539 |
| 6,691,967 | B2 | 2/2004 | Kaupp | |
| 7,168,669 | B2 | 1/2007 | Park | |
| 7,510,158 | B1 * | 3/2009 | Terry | .................... B60N 3/106 |
| | | | | 220/529 |
| 8,480,151 | B2 * | 7/2013 | Gaudig | .................... B60N 3/105 |
| | | | | 296/24.34 |
| 9,248,770 | B2 * | 2/2016 | Brinas | .................... B60N 3/106 |
| 2003/0075661 | A1 | 4/2003 | Kaupp | |
| 2003/0094557 | A1 * | 5/2003 | Takahashi | ............ B60N 2/0224 |
| | | | | 248/311.2 |
| 2003/0155477 | A1 | 8/2003 | Schaal | |
| 2005/0072889 | A1 | 4/2005 | Park | |
| 2006/0237612 | A1 * | 10/2006 | Thomas | .................... B60R 7/04 |
| | | | | 248/311.2 |
| 2009/0159623 | A1 | 6/2009 | Kreutmayr | |
| 2015/0001363 | A1 * | 1/2015 | Bohlke | .................. B60N 3/106 |
| | | | | 248/311.2 |

FOREIGN PATENT DOCUMENTS

| | | |
|---|---|---|
| DE | 102 06 267 A1 | 8/2003 |
| DE | 103 59 294 A1 | 5/2005 |
| DE | 10 2004 011 306 A1 | 9/2005 |
| DE | 20 2006 015 893 U1 | 2/2007 |
| DE | 20 2006 002 100 U1 | 7/2007 |
| DE | 10 2007 061 898 A1 | 6/2009 |
| EP | 1 277 613 B1 | 1/2003 |
| EP | 10 2012 221 398 A1 | 5/2013 |
| JP | 2002096669 A | 4/2002 |

* cited by examiner

RECEIVING DEVICE FOR AT LEAST ONE FOOD OR BEVERAGE CONTAINER IN A MOTOR VEHICLE

CROSS-REFERENCE TO RELATED APPLICATIONS

This claims priority from German Patent Application No. 10 2014 220 595.6, filed on Oct. 10, 2014, the disclosure of which is hereby incorporated by reference in its entirety into this application.

FIELD OF THE INVENTION

The invention relates to a receiving device for at least one food or beverage container in a motor vehicle, with a trough-shaped receiving housing which has a base and encircling wall sections, and with at least one movable supporting part which, together with at least one wall section of the receiving housing, forms a container holder in order to support a food or beverage container laterally, and the at least one supporting part being mounted in an infinitely adjustable manner in the receiving housing.

BACKGROUND OF THE INVENTION

A receiving device of this type is known from DE 10 2012 221 398 A1. The known receiving device is provided for a vehicle interior of a passenger vehicle and is arranged in a central arm rest of a rear seat bench or in a central console between corresponding front seats. The receiving device has a trough-shaped receiving housing which comprises a base and encircling wall sections. Two supporting parts which can be shifted longitudinally in the receiving housing and, in each case together with corresponding wall sections of the receiving housing, define a container holder are provided in the interior of the trough-shaped receiving housing. The adjustability of the two supporting parts serves to be able reliably to support containers of differing size in the receiving housing. Each supporting part is guided displaceably on the opposite end sides thereof by means of a respective guide arrangement in a respective guide groove of the receiving housing. In addition, the guide arrangements and the guide grooves are assigned latching means in order to be able to lock the respective supporting part in a desired adjustment position. The intermeshing of the latching means of the respective guide arrangement and of the guide groove takes place via spring force which acts in the vertical direction on the supporting parts.

SUMMARY OF THE INVENTION

It is the object of the invention to provide a receiving device of the type mentioned at the beginning which is constructed in a simple manner and permits an extremely simple adaptation of the at least one supporting part to food or beverage containers of differing size.

This object is achieved in that at least one tension or compression spring arrangement is provided which continuously exerts a tensile or compressive force on the at least one supporting part in the adjustment direction. The at least one supporting part is accordingly held continuously in an end position in the adjustment direction by the tension or compression spring arrangement. The supporting part here is continuously held, preferably by the tension or compression spring arrangement, in the end position in which the smallest possible receiving space for a container holder is defined. An operator can insert a corresponding food or beverage container in a simple manner into the receiving housing by adjustment of the supporting part counter to the tensile or compressive force by the supporting part being adjusted manually by a single action, i.e. the receiving space for the container holder being widened. The continuous tensile or compressive force which acts on the supporting part inevitably has the effect that, after the corresponding food or beverage container is inserted, the supporting part is automatically placed on to a corresponding container wall and clamps the latter in the container holder. The solution according to the invention is suitable in a particularly advantageous manner for can, cup or bottle containers in which beverages are stored. In the same manner, however, cup- or can-like food containers can also be deposited into the receiving housing. The solution according to the invention is suitable in a particularly advantageous manner for use in a vehicle interior of a passenger vehicle. The trough-shaped receiving housing is advantageously arranged in the region of a central console of the vehicle interior or in the region of a central arm rest of a rear seat bench. The at least one supporting part can be arranged such that it can be adjusted in a linearly movable manner, pivotally movable manner or movably along a curved track. The use of a tension or compression spring arrangement is dependent on the positioning of the spring arrangement relative to the supporting part. If a compressive force is required for transferring the supporting part into the end position defining the smallest possible receiving space, a compression spring arrangement is used, and a tension spring arrangement is used in the reverse situation.

In a further refinement of the invention, the supporting part is mounted adjustably in at least one side wall section of the receiving housing. This is advantageous since opposite side wall sections of the receiving housing are preferably formed rectilinearly, and therefore a simple linearly movable adjustability of the supporting part can be accommodated in the at least one side wall section. The accommodating in the side wall section is also advantageous in the case of pivotally movable adjustability.

In a further refinement of the invention, the supporting part is guided in a linearly movable manner by means of at least one guide carriage in a longitudinal guide of the side wall section. In a particularly advantageous manner, the guide carriage is arranged on one side of the supporting part and is connected rigidly to the supporting part. Accordingly, the supporting part is provided with the guide carriage only on one side. The guide carriage is designed in such a manner that an adequate support of a container in the container holder formed by wall sections of the receiving housing and by the supporting part is ensured. The rigid arrangement of the guide carriage on the supporting part can be provided by an integral connection or production of the guide carriage with the supporting part, or by a rigid fastening of the guide carriage to the side of the supporting part with the aid of mechanical fastening means, such as, in particular, at least one fastening screw.

In a further refinement of the invention, the supporting part, on a side opposite the guide carriage, is provided with a supporting lug which protrudes toward an opposite side wall section of the receiving housing and is supported in a slidingly movable manner in the side wall section of the receiving housing. The supporting lug on that side of the supporting part which is opposite the guide carriage contributes to a reduction in tilting moments on the rigid connection between guide carriage and supporting part, which tilting moments may occur due to the placing of a heavy food or beverage container thereon. By this means, a linearly movable adjustability of the at least one supporting part is improved.

In a further refinement of the invention, a longitudinal groove which is complementary to the supporting lug is provided in the side wall section. A torque support via the supporting lug in the side wall section of the receiving housing is thereby further improved. In addition, the supporting lug in conjunction with the longitudinal groove can improve the sliding movability of the supporting part relative to the opposite side wall sections of the receiving housing.

In a further refinement of the invention, the tension or compression spring arrangement is coupled at one end to the supporting part and at the other end to the receiving housing. The tension or compression spring arrangement is preferably formed by a longitudinally extending strand element which is designed to be elastically flexible in the tension direction or in the compression direction.

In a further refinement of the invention, the tension or compression spring arrangement is connected on opposite end regions to two adjacent supporting parts which are guided in a linearly movable manner in the receiving housing. The respectively adjacent supporting part therefore forms the countersupport to a corresponding tensile or compressive loading which acts on the other supporting part. In a particularly advantageous manner, at least one compression spring element acts between the adjacent supporting parts and continuously pushes the two supporting parts into an end position which in each case defines the smallest receiving space of the respective container holder.

In a further refinement of the invention, the at least one supporting part is mounted in a pivotally movable manner in a side wall section. A change in the receiving dimensions of the container holder formed in this manner takes place in a simple manner by pivoting the at least one supporting part in a pivoting plane running parallel to the base of the receiving housing.

In a further refinement of the invention, the tension or compression spring arrangement is configured as a torsion spring arrangement and is arranged coaxially with respect to a pivot axis of a pivot mounting of the supporting part. In particular, a leg spring or a similarly configured mechanical torsion spring is provided as the torsion spring arrangement.

In a further refinement of the invention, the tension spring arrangement is formed by an elastomer band or a helical tension spring. The tension spring arrangement is preferably coupled at one end to the receiving housing and at the other end to the corresponding supporting part.

In a further refinement of the invention, two supporting parts are provided, which are provided, in each case on one side, with a rigidly arranged guide carriage, wherein the guide carriages are mounted in a linearly movable manner on opposite sides in the side wall sections of the receiving housing. The two supporting parts are thereby displaceable in a linearly movable manner within the receiving housing and are preferably movable toward each other or away from each other parallel to each other. As a result of the fact that each supporting part is in each case provided with a guide carriage arranged on one side, and the guide carriages are positioned opposite each other, just one guide arrangement for one guide carriage has to be provided in each of the two opposite side wall sections of the receiving housing. This results in a favorable distribution of components and in the capability of producing the receiving device in a simple manner.

BRIEF DESCRIPTION OF THE DRAWINGS

Further advantages and features of the invention emerge from the claims and from the description below of preferred exemplary embodiments of the invention, which are illustrated with reference to the drawings.

DETAILED DESCRIPTION

A receiving device 1 according to FIGS. 1 to 5 is provided for use in the region of a central console or a central arm rest in a vehicle interior of a passenger vehicle. The receiving device 1 is preferably inserted into a corresponding depression in the central console or the central arm rest and is fixed there in such a manner that an upper edge region 5 of a receiving housing 2 of the receiving device 1 ends at least substantially flush with a surface of the central console or of the central arm rest.

The receiving device 1 has a trough-shaped receiving housing 2 which has a substantially oval area. The receiving housing 2 has a solid flat base 3 which is surrounded by upwardly protruding encircling wall sections. On opposite sides, the receiving housing 2 has two substantially rectilinearly extending side wall sections 4. The wall sections end upwardly at an encircling edge region 5 which is configured as a supporting edge protruding outward, in order to be able to recess the receiving housing 2 in a corresponding depression in the central console or in the central arm rest and to be able to support same with the upper edge region 5 in the region of the surface of the central console or of the central arm rest. The receiving housing 2, including the base 3, the opposite side wall sections 4 and the end-side wall sections 4a, which are curved in a semicylindrical manner, and the upper edge region 5, is produced integrally from plastic. The receiving housing 2 forms two container holders which are each assigned a pattern of pimples in the manner of a circle or disk on the base 3 in order to improve a standing position of a respectively corresponding food or beverage container. One to two food or beverage containers of differing size, in particular in the form of cups, cans or bottles, can be inserted into the receiving housing 2 of the receiving device 1. Corresponding internal dimensions of the receiving housing 2, in particular the width thereof between the opposite side wall sections 4, limit a maximum diameter of a corresponding food or beverage container in order also to permit insertion into the receiving housing 2.

In order to be able to hold even food or beverage containers in the receiving housing 2 of smaller diameters or areas securely in the receiving housing 2, each of the two container holders within the receiving housing 2 is in each case assigned a supporting part 6 which is in each case mounted so as to be displaceable in a linearly movable manner along the opposite side wall sections 4 in the receiving housing 2. The two supporting parts 6 are configured identically to each other and, in the fitted state within the receiving housing 2, extend as separating webs transversely between the opposite side wall sections 4. The two supporting parts 6 are produced from plastic.

Figure 1:
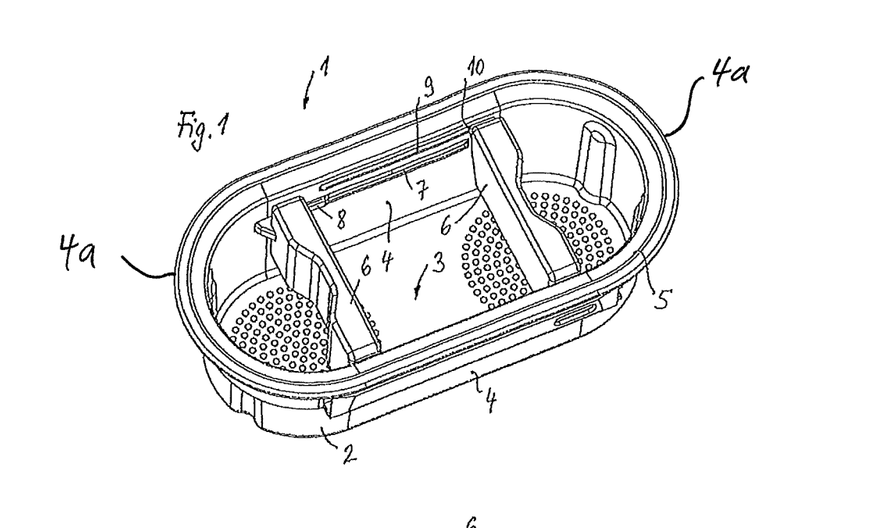
FIG. 1 shows a perspective illustration obliquely from above of an embodiment of a receiving device according to the invention.
Figure 2:
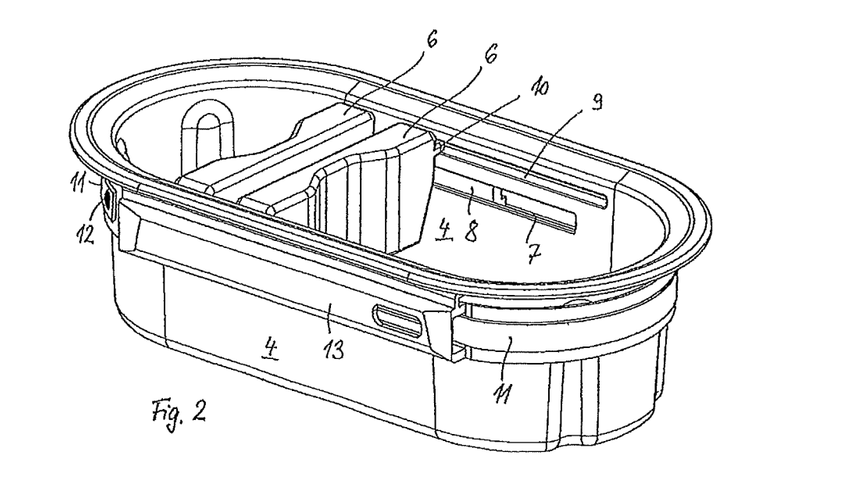
FIG. 2 shows an enlarged perspective illustration of the receiving device according to FIG. 1.
Figure 3:
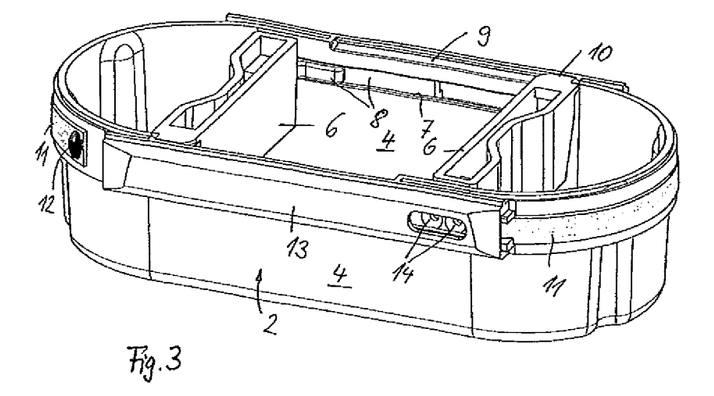
FIG. 3 shows a perspective sectional illustration of the receiving device according to FIGS. 1 and 2, wherein a sectional plane lies below an upper edge region parallel to a base of a receiving housing.
Figure 4:
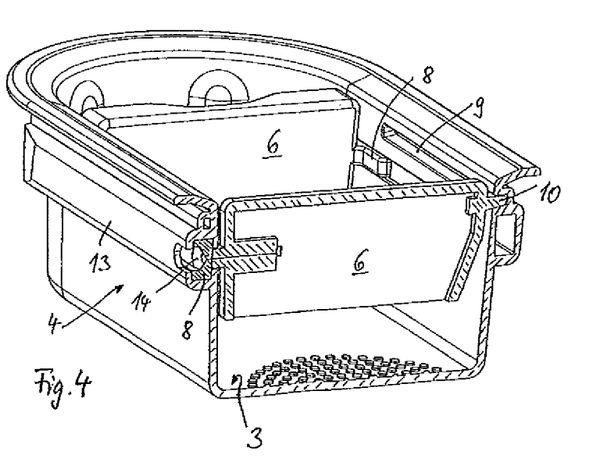
FIG. 4 shows a perspective cross sectional illustration of the receiving device according to FIGS. 1 to 3 level with a movable supporting part.
Figure 5:
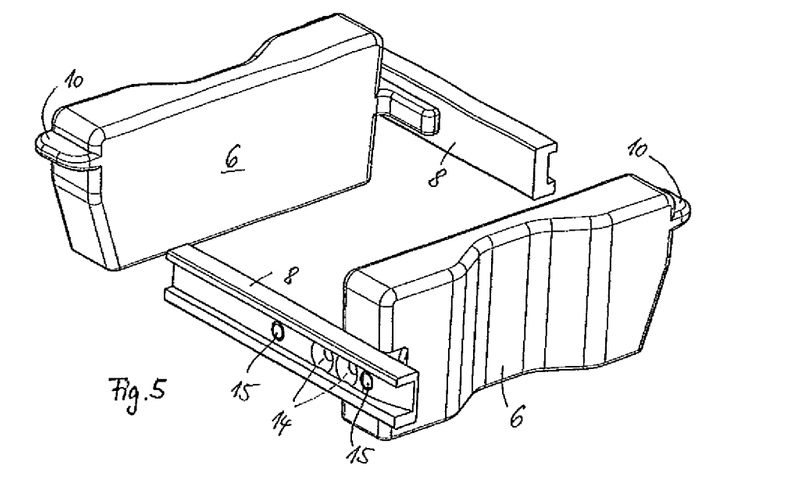
FIG. 5 shows an enlarged perspective illustration of two supporting parts of the receiving device according to FIGS. 1 to 4.

As can readily be seen with reference to FIG. 5, each supporting part 6 is provided on one side with a guide carriage 8 which is designed as a profiled rail extending in the longitudinal direction of the receiving housing 2. The profiled rail has a U-shaped profile, the U-limbs of which are extended outward laterally away from the supporting part 6. The guide carriage 8 is fastened laterally to the respective supporting part 6 with the aid of two fastening screws. The fastening screws are indicated by countersunk head bores 14 in a base region of the guide carriage 8. The fastening screws cut in a simple manner into the plastics material of the respective supporting part 6 as they are being screwed in. In the fitted state on the respective supporting part 6, each guide carriage 8 is oriented in a manner protruding at a right angle from the supporting part 6, as seen in a top view.

Each supporting part 6, on the side thereof opposite the guide carriage 8, also has an integrally formed supporting lug 10 which protrudes laterally outward to the opposite side and serves as an auxiliary guide for the respective supporting part 6. It can be seen with reference to FIG. 5 that the supporting parts 6 are oriented in the receiving housing 2 in an oppositely directed manner to each other, and therefore the one guide carriage 8 of the one supporting part 6 is positioned in the region of the left side wall section 4 and the other guide carriage 8 of the other supporting part 6 is positioned in the region of the right side wall section 4. The two guide carriages 8 serve for the linearly movable guidance of the respective supporting part 6 in a respective side wall section 4 of the receiving housing 2. For this purpose, each side wall section 4 is provided with a longitudinal guide 7 which is designed as a longitudinal slot in the corresponding side wall section 4 and as a guide rail profile 13 fitted on to the outer side of the respective side wall section 4. When the receiving device 1 is fitted ready for operation, the two guide rail profiles 13 are connected rigidly to a respective outer side of the respective side wall section 4, in particular by welding or by adhesive bonding. Each guide rail profile 13 is designed in such a manner that the respective guide carriage 8 is mounted so as to be displaceable in a linearly movable manner in the guide rail profile 13.

In addition, each side wall section 4 has, above the longitudinal slot of the longitudinal guide 7, a longitudinal guide groove 9 into which, in the fitted state, the supporting lug 10 of the respective supporting part 6 enters in a slidingly movable manner. The longitudinal groove 9 and the supporting lug 10 thus form the desired auxiliary guide for supporting the supporting part 6 on the side opposite the respective guide carriage 8.

Both the longitudinal slot of the respective longitudinal guide 7 and the longitudinal groove 9 for the respective supporting lug 10 extend along the two side wall sections 4 over a length which is adapted to maximum displaceability of the respective supporting part 6. The minimal end positions of the two supporting parts 6, in which the two container holders, which are defined by a bearing surface of the respective supporting part 6 on the one hand and an inner wall of the curved wall sections of the receiving housing 2 on the other hand, are illustrated with minimal receiving space, with reference to FIGS. 1 and 3. In order to increase the receiving space for the respective container holder, the respective supporting part 6 is displaced in a simple manner toward the center of the receiving housing 2 in the direction toward the other supporting part 6. The two supporting parts 6 are displaceable in an infinitely variable manner by the sliding movability of the guide carriages 8 in the respective guide rail profile 13.

In order, firstly, to hold the supporting parts 6, in the unused rest position, in the respectively minimal end position of the respective container holder and, secondly, when a food or beverage container is inserted into the corresponding container holder, to ensure that the supporting part 6 continuously bears against an outer wall of the corresponding container, each supporting part 6 is continuously loaded by a tension spring arrangement which, in the exemplary embodiment according to FIGS. 1 to 5, is formed by a respective elastic tension strand 11 in the form of an elastomer band. The elastomer band 11 is connected fixedly on an end region via two fastening points 15 (FIG. 5) to the base of the respective guide carriage 8. The elastomer band 11 here has a strip width which approximately corresponds to a distance of the U-limbs of the guide carriage 8 with respect to each other, and therefore the elastomer band 11 is embedded between the two U-limbs of the guide carriage 8. The elastomer band is guided on the outer side around the respectively semicylindrically curved wall section of the receiving housing 2 and, in the region of an opposite side of the receiving housing 2, is fixed at the other end region thereof to the receiving housing 2 via a further fastening point 12. In the fitted state, the elastomer band 11 extends parallel below the upper edge region 5 around the curvature, which is in the manner of a semicircle, of the curved wall section, as can be seen with reference to FIGS. 2 and 3. Accordingly, the receiving device 1 has two elastomer bands 11, wherein one elastomer band 11 is fastened in each case to the respective guide carriage 8 of the respective supporting part 6 and is fixed at the other end region thereof to the receiving housing. The fixing of the elastomer band 11 on one side to the receiving housing 2 and on the other side to the guide carriage 8 takes place in such a manner that the elastomer band 11 is still under pretension even in the minimal end position of the respective supporting part 6, in which the supporting part 6 strikes against the end of the longitudinal slot of the respective longitudinal guide 7.

As soon as a food or beverage container having somewhat larger cross sectional dimensions than the minimal dimensions of the container holder in the respective minimal end position of the supporting part 6 is then inserted into the receiving device, when the insertion takes place, the supporting part 6 can be displaced in a simple manner by a corresponding operator toward the center of the receiving housing 2 by a base region of the food or beverage container until the food or beverage container automatically enters the corresponding container holder and strikes against the base 3 of the receiving housing 2. The continuous tensile loading by the respective elastomer band 11 inevitably leads to the supporting part 6 pressing with the inner surface thereof against the side wall of the food or beverage container and thus also pressing the food or beverage container against the inner wall of the respectively curved wall section of the receiving housing 2. A secure holding of the corresponding food or beverage container in the receiving device 1 is thus ensured in order to avoid tilting of the food or beverage container during the driving mode of the passenger vehicle.

Figure 6:
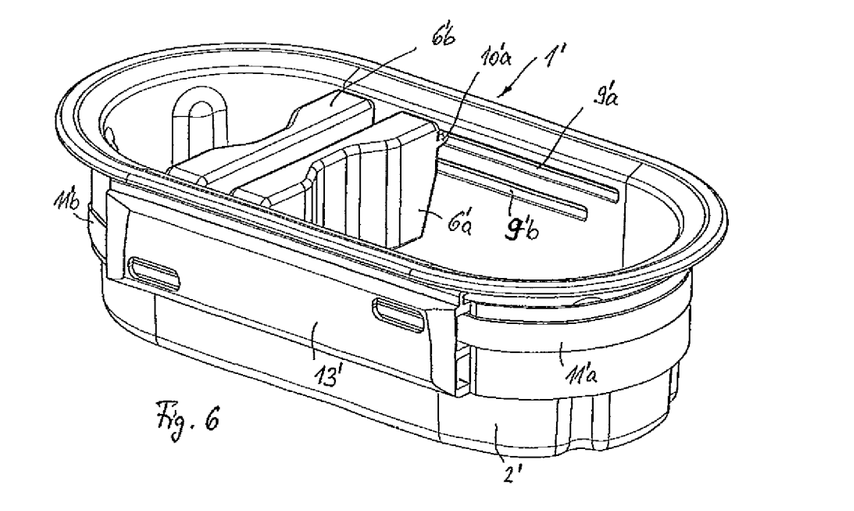
FIG. 6 shows a perspective illustration of a further embodiment of a receiving device similarly to FIGS. 1 to 5.

The embodiment according to FIG. 6 substantially corresponds to the embodiment of a receiving device 1 described previously with reference to FIGS. 1 to 5. The receiving device 1' is provided with the same reference numbers with respect to constructionally or functionally identical parts and sections, with the addition of an apostrophe '. A substantial difference in the embodiment according to FIG. 6 is that the two supporting parts 6'a and 6'b are provided with guide carriages (not illustrated specifically) which are mounted so as to be displaceable in a linearly movable manner on the same side, but at different heights in a common side wall section of the receiving housing. The two guide carriages are therefore traveling in parallel one above the other in the corresponding side wall section. For this purpose, the guide rail profile 13' is provided as a double guide with two longitudinal guides arranged one above the other. Accordingly, the supporting lugs 10'a, which serve for the auxiliary guidance, of the two supporting parts 6'a, 6'b are likewise supported on a common side in the region of the opposite side wall section. For this purpose, the opposite side wall section has two longitudinal grooves 9'a, 9'b which are arranged one above the other and run parallel to each other. The two supporting lugs 10'a of the two supporting parts 6'a and 6'b are arranged at a different height at the side of the respective supporting part 6'a, 6'b in order to be able to respectively enter one of the two longitudinal grooves 9'a, 9'b. In an analogous manner, the guide carriages 8 of the two supporting parts 6'a, 6'b are of course also mounted so as to be displaceable linearly at a differing height in the guide rail profile 13'. Accordingly, the side wall section of the receiving housing that is provided with the guide rail profile 13' has two longitudinal slots, not visible with reference to FIG. 6, arranged one above the other. Owing to the arrangement of the two guide carriages, which are spaced apart from each other in the vertical direction, for the supporting parts 6'a, 6'b, the two tension spring arrangements in the form of the elastomer bands 11'a, 11'b also engage at different heights on the same side on the respective guide carriage and, in the region of the opposite side of the receiving housing, are fastened on the housing. Also in the case of the embodiment according to FIG. 6, the elastomer bands 11'a, 11'b exert a continuous pretension on the supporting parts 6'a, 6'b even in the minimal end positions of the two supporting parts 6'a, 6'b. According to the previously described embodiment according to FIGS. 1 to 5, the minimal end positions of the supporting parts 6'a, 6'b are formed by the end positions of the supporting parts 6'a, 6'b, in which the respectively defined container holder takes up the minimal receiving space thereof.

Figure 7:
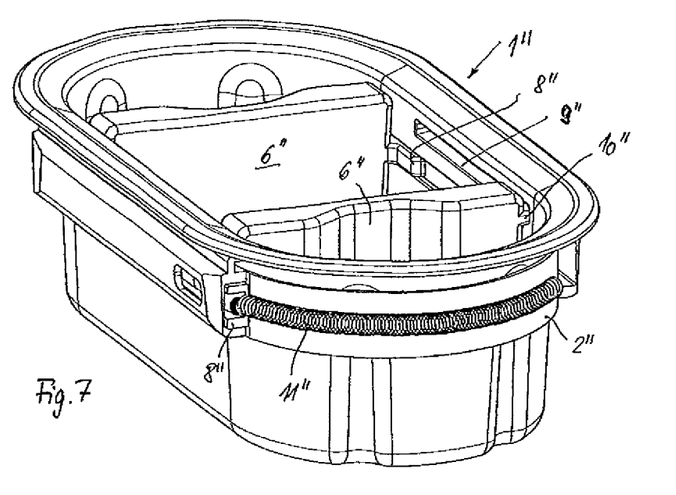
FIG. 7 shows a further embodiment of a receiving device according to the invention similarly to FIGS. 1 to 5.

The receiving device 1" according to FIG. 7 substantially corresponds to the embodiment of the receiving device 1 previously described with reference to FIGS. 1 to 5. The same components and sections are therefore provided with the same reference number with the addition of a double apostrophe ". The sole difference in the case of the embodiment according to FIG. 7 is that, instead of a respective elastomer band, the tension spring arrangement is formed by a respective helical tension spring 11". The helical tension spring 11" is coupled in an analogous manner as in the embodiment according to FIGS. 1 to 5 at the opposite ends thereof at one end to the respective guide carriage 8" and at the other end to the receiving housing 2" and is pretensioned in such a manner that the respective supporting part 6" is under pretension by the respective helical tension spring 11" even in the minimal end position.

Figure 8:
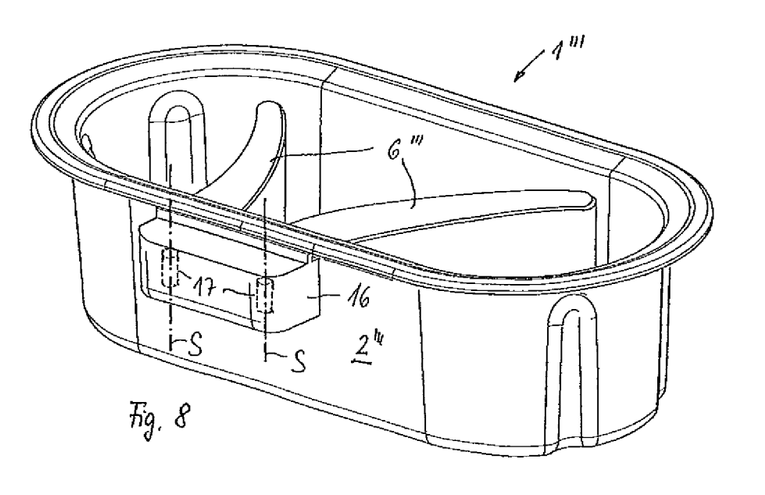
FIG. 8 shows a further embodiment of a receiving device according to the invention with supporting parts arranged in a pivotally movable manner.

The embodiment according to FIG. 8 provides a receiving device 1''' which likewise comprises a receiving housing 2''' with a base, opposite side wall sections and wall sections curved on the end side, as has already been explained with reference to the previously described embodiments. A substantial difference in the case of the receiving device 1''' according to FIG. 8 is that the two supporting parts 6''' for the internal delimitation of the two container holders within the receiving housing 2''' are not formed by separating webs displaceable in a linearly movable manner, but rather by supporting arms which are pivotally movable. The two supporting parts 6''' are mounted in the region of a common side wall section of the receiving housing 2''' in a receiving body 16 so as to be pivotally movable about pivot axes S extending parallel to each other and in the vertical direction, and therefore identical pivot planes running parallel to the base of the receiving housing 2''' are produced for the two supporting parts 6'''. The receiving body 16, in which the pivot mounting for the two supporting parts 6''' including the two torsion spring arrangements 17 are integrated, is fixedly connected to the side wall section of the receiving housing 2''', in particular by adhesive bonding or welding, or in an interlocking manner by latching. The two supporting parts 6''' are subjected to a torque about the pivot axis S in opposite directions to each other by means of a respective torsion spring arrangement 17, wherein the torsion spring arrangements 17 are preferably formed by leg springs which are supported at one end of the receiving body 16 and at the other end of the respective supporting part 6'''. The pivotal movability of each supporting part 6''' is restricted between a minimal position and a maximal position, which are formed by stops in the receiving body 16 or in the region of the side wall section of the receiving housing 2'''. The two torsion spring arrangements 17 are designed in such a manner that, analogously to the previously described embodiments, each supporting part 6''' is continuously subjected to spring force and accordingly to torque in the direction of the minimal end position. The two supporting parts 6''' protrude into the interior of the receiving housing 2''' toward the opposite side wall section in such a manner that said supporting parts can be pivoted towards the center of the receiving housing 2''' in order to be able to increase the receiving space for the corresponding container holder.

The invention claimed is:

1. A receiving device for at least one food or beverage container in a motor vehicle, with a trough-shaped receiving housing which has a base, first and second side wall sections disposed in opposed relation with one another and an end wall section, and with at least one movable supporting part extending across substantially an entire distance defined transversely between the first and second side wall sections, the supporting part, together with the end wall section disposed in opposed relation therewith, forming a container holder in order to support a food or beverage container laterally therebetween, the supporting part being mounted in the receiving housing for movement relative to the end wall section in an adjustment direction between a first position in which a portion of the supporting part disposed in facing relation with the end wall section is located a first distance therefrom, and a second position in which the portion of the supporting part is located a second distance from the end wall section, the second distance being greater than the first distance, the portion of the supporting part being positionable at any distance from the end wall section between the first position and the second position, the receiving device further including at least one tension or compression spring arrangement which continuously exerts a tensile or compressive force on the supporting part in the adjustment direction, the tension or compression spring arrangement being coupled at one end to the supporting part and at the other end to the receiving housing.

2. The receiving device as claimed in claim 1, wherein the supporting part is mounted adjustably in one of the first and second side wall sections of the receiving housing.

3. The receiving device as claimed in claim 2, wherein the supporting part is guided in a linearly movable manner in a longitudinal guide of the one side wall section by at least one guide carriage.

4. The receiving device as claimed in claim 3, wherein the guide carriage is arranged on one side of the supporting part, the one side being disposed adjacent the one side wall section, and the guide carriage is connected rigidly to the supporting part.

5. The receiving device as claimed in claim 4, wherein the one side wall section of the receiving housing is the first side wall section, the supporting part, on a side thereof opposite the guide carriage, is provided with a supporting lug which protrudes toward the second side wall section of the receiving housing and is supported in a slidingly movable manner in the second side wall section of the receiving housing.

6. The receiving device as claimed in claim 5, wherein a longitudinal groove which is complementary to the supporting lug is provided in the second side wall section, the supporting lug being slidingly engaged in the groove.

7. The receiving device as claimed in claim 1, wherein the tension or compression spring arrangement is formed by an elastomer band or a helical tension spring.

8. The receiving device as claimed in claim 1, wherein two supporting parts are provided, which supporting parts are provided, in each case on one side, with a rigidly arranged guide carriage, each guide carriage being mounted in a linearly movable manner in one of the first and second side wall sections of the receiving housing, the first and second side wall sections extending longitudinally along the receiving device.

9. The receiving device as claimed in claim 1, wherein the first and second side wall sections extend in a longitudinal direction of the receiving housing, the end wall section is a first end wall section and the receiving housing includes a second end wall section spaced longitudinally from the first end wall section and disposed in opposed relation therewith, the first and second end wall sections extending between and interconnecting the first and second side wall sections.

10. The receiving device as claimed in claim 9, wherein the adjustment direction is oriented in a direction towards the first end wall section and substantially parallel to the longitudinal direction of the receiving housing.

11. The receiving device as claimed in claim 9, wherein the adjustment direction is oriented in a direction towards the first end wall section.

12. The receiving device as claimed in claim 1, wherein the portion of the supporting part and the end wall section are disposed relative to one another to support a food or beverage container laterally therebetween.

13. A holder for storing at least one beverage container in a motor vehicle, said holder comprising: a housing including a base and a wall structure projecting upwardly from a peripheral region of said base, said housing including an upwardly-opening interior defined substantially by inwardly facing surfaces of said base and said wall structure, said wall structure having two laterally-spaced side wall sections extending in a longitudinal direction of said housing and two end wall sections interconnecting adjacent and opposed end regions of the respective side wall sections; at least one container support wall disposed in said interior of said housing transversely between said two side wall sections and in opposed relation with one of said end wall sections, said container support wall extending across substantially an entire distance defined transversely between said side wall sections, said container support wall being mounted within said interior for movement relative to said one end wall section between a minimum end position in which part of said container support wall and said one end wall section are spaced from one another a minimum distance to define a container-receiving space therebetween for laterally supporting a minimally-sized food or beverage container, and a maximum end position in which said part of said container support wall and said one end wall section are spaced from one another a maximum distance to define a container-receiving space therebetween for laterally supporting a maximum-sized food or beverage container, said part of said container support wall being positionable at the minimum and maximum positions and at any distance from said one end wall section between the minimum and maximum end positions; and a biasing arrangement supported on said housing to continuously exert a biasing force on said container support wall in a direction towards said one end wall section to maintain said container support wall in supporting engagement with a food or beverage container located within said container-receiving space, said biasing arrangement being coupled at one end to said container support wall and at the other end to said housing.

14. The holder as claimed in claim 13, wherein the direction of the biasing force exerted by said biasing arrangement is oriented substantially parallel to the longitudinal direction of said housing.

15. The holder as claimed in claim 13, further including a guide arrangement cooperating between said container support wall and said side wall sections of said housing and extending substantially linearly along said side wall sections to permit slidable movement of said container support wall into any position between the maximum and minimum end positions to accommodate food or beverage containers of varying sizes.

* * * * *